No. 817,817. PATENTED APR. 17, 1906.
C. H. SWARTZ.
REVERSING GEAR.
APPLICATION FILED AUG. 26, 1905.

Witnesses
E. F. Stewart
C. N. Woodward

Carl H. Swartz   Inventor
by C. A. Snow & Co.   Attorneys

UNITED STATES PATENT OFFICE.

CARL H. SWARTZ, OF FREEPORT, ILLINOIS.

REVERSING-GEAR.

No. 817,817.   Specification of Letters Patent.   Patented April 17, 1906.

Application filed August 26, 1905. Serial No. 275,982.

*To all whom it may concern:*

Be it known that I, CARL H. SWARTZ, a citizen of the United States, residing at Freeport, in the county of Stephenson and State of Illinois, have invented a new and useful Reversing-Gear, of which the following is a specification.

This invention relates to reversing-gears, more particularly to devices of this class employed in connection with turning-lathes, screw-cutters, and similar machines which require to be operated in opposite directions, and has for its object to simplify and improve the construction and increase the utility and efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1:
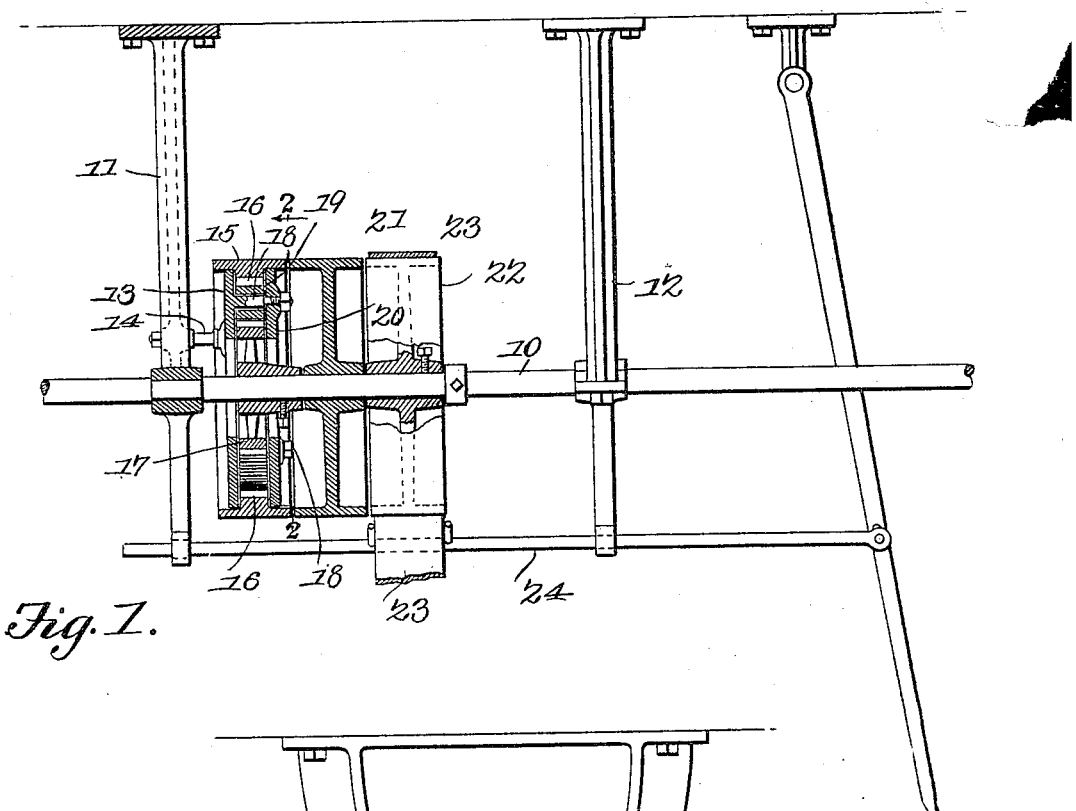
Figure 2:
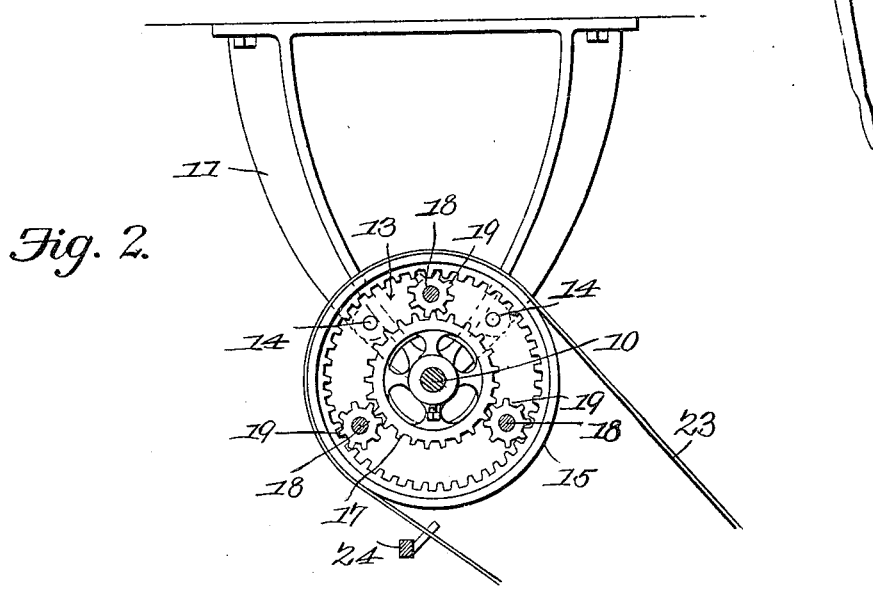

In the drawings thus employed, Figure 1 is a sectional side elevation of the improved device. Fig. 2 is a view in section on the line 2 2 of Fig. 1 with the drive-belt transferred to the reversing mechanism.

Corresponding parts in both the figures are indicated throughout by similar characters of reference.

In the improved device is comprised a drive-shaft 10, supported for rotation in hangers 11 12 of the usual construction. Surrounding the shaft 10 near one of the hangers is an annular plate 13, rigidly connected to the nearest hanger by spaced tie-bolts 14. Surrounding the shaft 10 and rotatively bearing upon the periphery of the plate 13 is a pulley-rim 15, having an internal gear 16, and fast to the shaft 10 within the pulley-rim is a gear-wheel 17. Pivoted, as at 18, to the plate 13 are a plurality of pinions 19, intermeshing both with the internal gear 16 and the gear-wheel 17. Connected to the outer ends of the studs 18 is an annular plate 20, with its periphery bearing against the inner face of the pulley-rim 15, the two plates thus forming the bearing upon which the pulley-rim rotates.

Running loosely upon the shaft 10 next to the pulley-rim 15 is a belt-pulley 21, and fast upon the shaft 10 next to the pulley 21 is a third belt-pulley 22, the rims of the two pulleys and the pulley-rim being uniform, so that a drive-belt (represented at 23) may be shifted, as by a shifting mechanism 24, to any one of the pulleys or to the pulley-rim. The belt 23 will be run over a driven pulley having a face equal to the combined faces of the three members 15, 20, and 23 in the ordinary manner; but as the construction and operation of such devices are so well known it is not illustrated.

With a device thus constructed it is obvious that when the belt 23 is shifted to the loose pulley 21 the shaft will not be rotated. Then if the belt be shifted to the pulley 23 the shaft will be rotated in the same direction as the belt is moving, and if the belt be shifted to the pulley-rim 15 the shaft will be moved in the opposite direction by the coaction of the internal gear 16, pinions 19, and gear-wheel 17. Thus the shaft may be rotated in either direction by merely shifting the belt from one pulley-rim to the other.

The plate 13 being rigidly connected to the hanger 11 and the plate 20 being rigidly connected to the plate 13 by the studs 18 produces an efficient bearing for the annular pulley-rim 15, which holds it firmly from lateral movement, while leaving it free to rotate about the shaft and communicate its motion thereto.

The device is simple in construction, can be inexpensively manufactured, and applied to any of the various forms of machinery requiring a reversing-gear.

Having thus described the invention, what is claimed is—

1. In a device of the class described, a drive-shaft, spaced stationary hangers supporting said shaft, a belt-pulley fast upon said shaft, a gear-wheel fast upon said shaft, a belt-pulley rim concentric to said shaft and equal in diameter to said belt-pulley and having an internal annular rib provided with inwardly-extending gear-teeth, a plate encircling said shaft and rigidly connected to one of said hangers and bearing at its periphery against the inner face of said pulley-rim and against the shoulder formed by said annular rib, and one or more pinions pivoted upon said plates and engaging said gear-wheel and the gear-teeth of said rib.

2. In a device of the class described, a drive-shaft, spaced stationary hangers supporting said shaft, a belt-pulley fast upon said shaft, a belt-pulley equal in diameter to said first-mentioned pulley and loose upon said shaft, a pulley-rim corresponding to said fast and loose pulleys and concentric to said shaft and provided with an internal rib having gear-teeth extending inwardly therefrom, a plate encircling said shaft and rigidly connected to one of said hangers and bearing at its periphery against the inner face of said pulley-rim and against the shoulder formed by said rib, a gear-wheel rigidly connected to said shaft, and pinions mounted for rotation upon said plate and engaging said gear-wheel and the gear-teeth of said rib.

In testimony that I claim the foregoing as my own I have hereto affixed my signature in the presence of two witnesses.

CARL H. SWARTZ.

Witnesses:
B. S. GRANSDEN,
H. M. BOLENDER.